US011958617B2

(12) United States Patent
Vandyke et al.

(10) Patent No.: US 11,958,617 B2
(45) Date of Patent: Apr. 16, 2024

(54) ENVIRONMENTAL CONTROL SYSTEM FOR USE IN AN AIRCRAFT

(71) Applicant: The Boeing Company, Chicago, IL (US)

(72) Inventors: Bryce Avery Vandyke, Mukilteo, WA (US); Megan E. Mahre, Everett, WA (US); Douglas Dean Maben, Seattle, WA (US)

(73) Assignee: The Boeing Company, Arlington, VA (US)

( * ) Notice: Subject to any disclaimer, the term of this patent is extended or adjusted under 35 U.S.C. 154(b) by 344 days.

(21) Appl. No.: 17/367,725

(22) Filed: Jul. 6, 2021

(65) Prior Publication Data

US 2022/0024595 A1 Jan. 27, 2022

Related U.S. Application Data

(60) Provisional application No. 63/055,630, filed on Jul. 23, 2020.

(51) Int. Cl.
*B64D 13/00* (2006.01)
*B64D 13/06* (2006.01)

(52) U.S. Cl.
CPC ...... *B64D 13/06* (2013.01); *B64D 2013/0625* (2013.01); *B64D 2013/0651* (2013.01); *B64D 2013/0688* (2013.01)

(58) Field of Classification Search
CPC ............ B64D 13/06; B64D 2013/0625; B64D 2013/0688; B64D 2013/0603; B64C 2001/009
See application file for complete search history.

(56) References Cited

U.S. PATENT DOCUMENTS

| | | | | |
|---|---|---|---|---|
| 2,433,544 A | | 12/1947 | Blake et al. | |
| 2,483,704 A | | 10/1949 | Leigh | |
| 4,432,514 A | * | 2/1984 | Brandon | B64C 1/18 244/129.1 |
| RE32,554 E | * | 12/1987 | Murphy | B64D 13/02 244/129.1 |
| 5,118,053 A | * | 6/1992 | Singh | B64C 1/18 244/129.1 |
| 5,137,231 A | * | 8/1992 | Boss | B64C 1/18 454/76 |

(Continued)

FOREIGN PATENT DOCUMENTS

| | | |
|---|---|---|
| EP | 0905018 A2 | 3/1999 |
| EP | 3170739 A1 | 5/2017 |
| WO | 2018132096 A1 | 7/2018 |

OTHER PUBLICATIONS

Extended European Search Report issued in European Application No. 21185437.7 dated Dec. 13, 2021; pp. 1-14.

*Primary Examiner* — Phutthiwat Wongwian
*Assistant Examiner* — Sherman D Manley
(74) *Attorney, Agent, or Firm* — Alleman Hall & Tuttle LLP

(57) ABSTRACT

An environmental control system for use in an aircraft includes at least one component positioned along a length of the aircraft and a decompression panel assembly comprising an array of apertures. The array of apertures is based on a location of the decompression panel assembly along the length of the aircraft relative to the at least one component.

20 Claims, 8 Drawing Sheets

(56) References Cited

U.S. PATENT DOCUMENTS

| | | | |
|---|---|---|---|
| 6,129,312 A * | 10/2000 | Weber | B64C 1/18 |
| | | | 244/129.4 |
| 6,264,141 B1 | 7/2001 | Shim et al. | |
| 6,651,932 B2 | 11/2003 | Diehl et al. | |
| 7,029,065 B2 | 4/2006 | Laib | |
| 8,955,803 B2 * | 2/2015 | Voss | B64C 1/18 |
| | | | 244/129.4 |
| 9,233,747 B2 * | 1/2016 | Perkins | B64C 1/18 |
| 9,499,251 B2 * | 11/2016 | Perkins | B64F 5/10 |
| 9,566,759 B2 * | 2/2017 | Perkins | B64C 1/18 |
| D817,851 S * | 5/2018 | Perkins | D12/345 |
| 10,029,798 B2 * | 7/2018 | Gray | B64C 1/40 |
| 10,399,660 B2 * | 9/2019 | Brown | B64C 1/066 |
| 10,494,079 B2 * | 12/2019 | Sterling | B64F 5/10 |
| 10,899,428 B2 | 1/2021 | Sterling et al. | |
| 2003/0222175 A1 * | 12/2003 | Movsesian | B64C 1/1469 |
| | | | 244/118.5 |
| 2006/0169839 A1 * | 8/2006 | French | B64C 1/1469 |
| | | | 244/118.5 |
| 2006/0169840 A1 * | 8/2006 | French | B64D 45/0028 |
| | | | 244/118.5 |
| 2009/0050741 A1 * | 2/2009 | Muller | A62C 3/08 |
| | | | 244/121 |
| 2015/0115104 A1 * | 4/2015 | Perkins | B64C 1/18 |
| | | | 244/119 |
| 2018/0127100 A1 * | 5/2018 | Roth | B64D 13/04 |
| 2020/0407038 A1 * | 12/2020 | Tubbs | B64C 1/18 |
| 2022/0024594 A1 * | 1/2022 | Maben | B64D 13/02 |

\* cited by examiner

ENVIRONMENTAL CONTROL SYSTEM FOR USE IN AN AIRCRAFT

CROSS-REFERENCE TO RELATED APPLICATIONS

This application is a non-provisional application and claims priority to U.S. Provisional Patent Application Ser. No. 63/055,630, filed Jul. 23, 2020, which is hereby incorporated by reference in its entirety.

FIELD

The field of the present disclosure relates generally to environmental control systems and, more specifically, to environmental control systems that limit airflow forward and aftward through adjacent passenger aisles.

BACKGROUND

One purpose of an environmental control system is to distribute air through the main passenger cabin of the aircraft. Generally, air is supplied through ducts in the cabin ceiling and then flows through return air grills located near the cabin floor in the sidewall of each aisle. In many known configurations, the return air grills are built into decompression panel assemblies and are identical to each other along the cabin such that each return air grill provides a substantially similar airflow restriction therethrough. At least some known environmental control systems also include various components, such as filters, fans, and air conditioning packs that draw air through the return air grills. These components are positioned at various locations along the aircraft and so they draw air primarily through the return air grills from the aisles around which the component is located. Because each of the return air grills have a similar flow restriction, there tends to be a cross-aisle airflow in the aft or forward direction toward the nearest component of the environmental control system drawing air through the return air grills. In such a configuration, the airflow entering the return air grills in the aisle nearest the drawing component may have passed through one or more adjacent aisles, thus exposing the passengers in the component aisle to more cross-aisle airflow than passengers seated in aisle further from the drawing component of the environmental control system.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, an environmental control system for use in an aircraft is provided. The environmental control system includes at least one component positioned along a length of the aircraft and a decompression panel assembly comprising an array of apertures. The array of apertures is based on a location of the decompression panel assembly along the length of the aircraft relative to the at least one component.

In another aspect, an aircraft is provided. The aircraft includes a first aisle including a first decompression panel assembly having a first array of apertures that define a first airflow restriction. The aircraft also includes a second aisle including a second decompression panel assembly having a second array of apertures that define a second airflow restriction different than the first airflow restriction.

In yet another aspect, a decompression panel assembly for use in an aircraft is provided. The decompression panel assembly includes a frame, a housing including a rear wall that is spaced from the frame, and a pair of decompression panels coupled to the rear wall and extending toward the frame.

In yet another aspect, a decompression panel assembly for use in an aircraft having an environmental control system is provided. The decompression panel assembly includes a housing that defines a chamber and an insert configured to be positioned within the chamber. The insert includes an array of apertures configured to provide a predetermined airflow restriction through the decompression panel assembly. The array of apertures is based on a location of the decompression panel assembly along a length of the aircraft.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Examples described below include an environmental control system that facilitates minimizing airflow between passengers within confined spaces, such as aircraft passenger cabins. Example systems described provide decompression panel assemblies that include different flow restrictions based on their location along the length of the aircraft and proximity to other components of the environmental control system. In one example, the aircraft includes a first aisle having a first decompression panel assembly with a first array of apertures that define a first airflow restriction. Similarly, a second aisle includes a second decompression panel assembly having a second array of apertures that define a second airflow restriction different than the first airflow restriction. The different air flow restrictions are configured to provide a substantially similar mass flow through both the decompression panel assemblies. Having a similar mass flow through the decompression assemblies in each aisle facilitates limiting cross-circulation between passengers seated in adjacent aisles. Example systems facilitate reducing the spread of airborne contaminants between nearby occupants, reducing noise and undesirable drafts, and limiting the formation of stagnant zones of circulation within the confined space.

Figure 1:
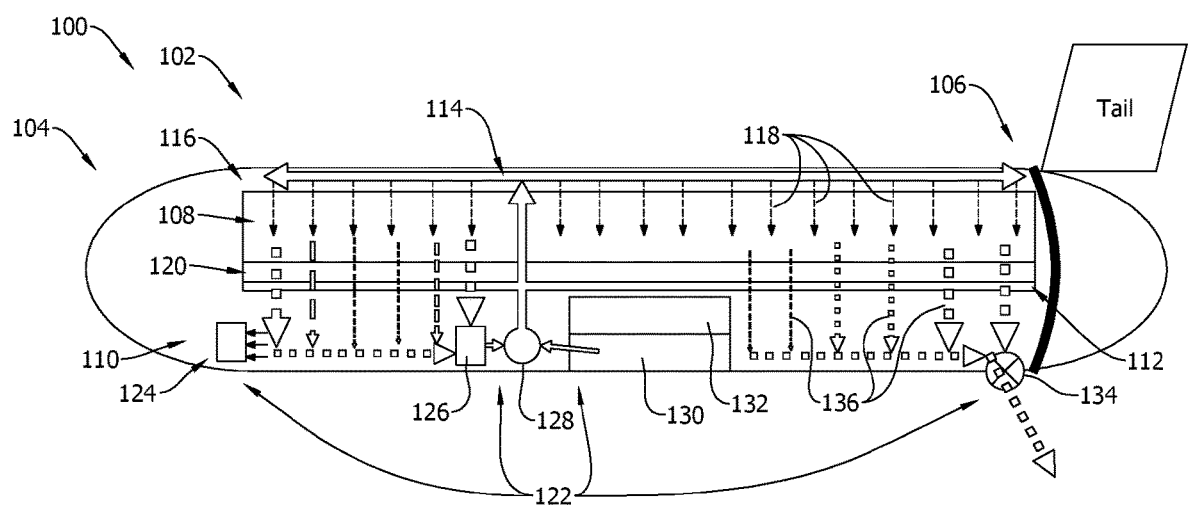
FIG. 1 is a schematic cross-sectional view of an aircraft cabin with an example environmental control system.

Referring to the drawings, FIG. 1 is a cross-sectional view of an aircraft 100 having an example environmental control system (ECS) 102. Aircraft 100 includes a forward end 104, an aft end 106, and a passenger cabin 108 extending therebetween. Cabin 108 is separated from a lower lobe 110 of aircraft 100 by a cabin floor 112. In the embodiment, ECS 102 circulates air through cabin 108 to provide the passengers with cool, clean air. ECS 102 includes a main distribution duct 114 defined in the crown volume 116 above cabin 108. From main distribution duct 114, air is channeled to each row or aisle 118 in cabin 108 such that a generally uniform distribution air airflow is distributed to cabin 108 from main distribution duct 114.

In the embodiment, ECS 102 includes a variety of components 122 located in lower lobe 110 that draw air from cabin 108 through a return air grill defined in a decompression panel assembly 120 in each aisle 118. More specifically, components 122 include a cooling filter 124 positioned proximate forward end 104. Components 122 also include a recirculation filter 126, a mixing manifold 128, and at least one air conditioning pack 130, which are all positioned proximate a wing box 132 of aircraft 100. Additionally, an outlet valve 134 is positioned at aft end 106. Generally, components 122 are positioned along the length of the aircraft 100 between forward end 104 and aft end 106 at any location that facilitates operation of ECS 102 as described herein.

In operation, each component 122 of ECS 102 draws air through decompression panel assemblies 120. However, the pressure of the draw or suction force 136 through each decompression panel assembly 120 will vary based on its location relative to one of components 122. Specifically, decompression panel assemblies 120 closest to each component will have a higher suction or draw force because of the close proximity. For example, cooling filter 124 and outlet valve 134 exert a higher draw force on decompression panel assemblies in aisles 118 at forward end 104 and aft end 106, respectively. Similarly, recirculation filter 126 and air conditioning pack 130 cause a higher suction force at decompression panel assemblies 120 in aisles 118 closer thereto. As such, the suction force through decompression panel assemblies 120 in aisles 118 that are distanced from components 122 is relatively lower. This idea is illustrated in FIG. 1 by showing the suction force of selected aisles in broken lines. The thicker and denser the line, the higher the suction force on the corresponding decompression panel assembly 120.

Figure 2:
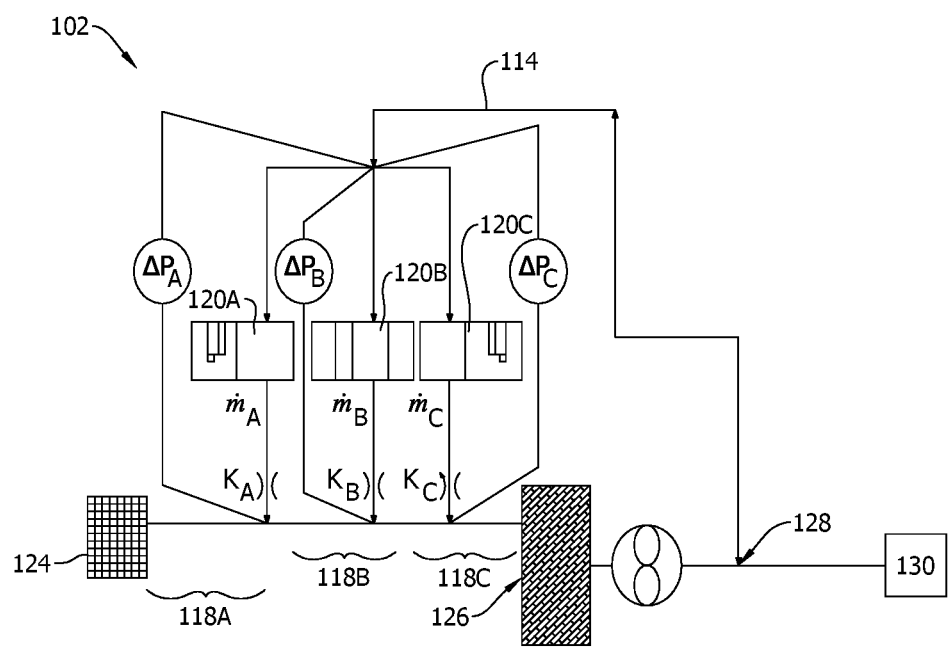
FIG. 2 is a schematic view of the environmental control system shown in FIG. 1 illustrating example decompression panels.

FIG. 2 is a schematic view of ECS 102 illustrating example decompression panel assemblies 120. More specifically, FIG. 2 is a schematic illustration of a first aisle 118A having a first decompression panel 120A, a second aisle 118B having a second decompression panel 120B; and a third aisle 118C having a third decompression panel 120C. As described above, each aisle 118A, 188B, and 118C has a different suction force, ΔP, due to its proximity to various components of ECS 102. Specifically, aisles 118A and 118C have higher suction forces $\Delta P_A$ and $\Delta P_C$ due to their relative proximity to cooling filter 124 and recirculation filter 126. Aisle 118B has a lower suction force $\Delta P_C$ because it is spaced further from cooling filter 124 and recirculation filter 126. Additionally, each aisle 118A, 188B, and 118C has a constant structure flow restriction AR through lower lobe 110.

In order to prevent or reduce cross-aisle airflow and to expose passengers of each aisle 118 only to air from their aisle 118, the mass flow, ṁ, through each decompression panel 120 should be the same. Because of the difference in suction forces ΔP, in the embodiment, each decompression panel assembly 120 may have a different airflow restriction constant K. More specifically, decompression panel assemblies 120 positioned closer to components 122 of ECS 102 include an airflow restriction constant K that is higher than decompression panel assemblies 120 spaced from components 122. For example, referring to FIG. 2, the relatively higher suction force $\Delta P_A$ in aisle 118A means that decompression panel 120A will have a higher airflow restriction constant $K_A$ than airflow restriction constant $K_B$ of decompression panel 120B in aisle 118B, which is subjected a lower suction force $\Delta P_B$. In such a configuration, the difference in airflow restriction constants $K_A$ and $K_B$ result in the mass flow $\dot{m}_A$ through decompression panel assembly 120A of aisle 118A being substantially similar to the mass flow $\dot{m}_B$ through decompression panel assembly 120B of aisle 118B. Similarly, the airflow restriction constant $K_C$ of decompression panel 120C is tailored such that the mass flow $\dot{m}_C$ through decompression panel assembly 120C of aisle 118C is substantially similar to the mass flows $\dot{m}_A$ and $\dot{m}_B$. As such, the airflow restriction constant K of each decompression panel assembly 12 is tailored based on its location along aircraft and proximity to components 122 of ECS 102 such that the mass flow ṁ of aisles 118A, 118B, and 118C are substantially similar. In the event of decompression, the decompression panel assembly 120 at least partially separates from a frame or grill (not shown) to allow a higher mass flow of air therethrough.

Figure 3A:
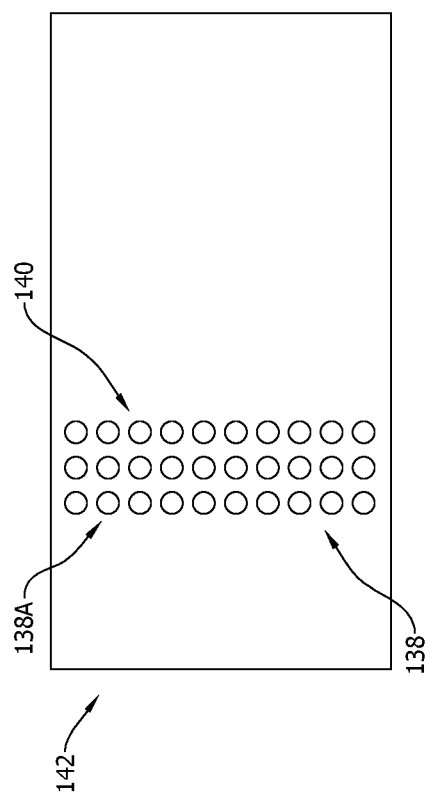
FIG. 3A is a front view of an example decompression panel having a first aperture array.
Figure 3B:
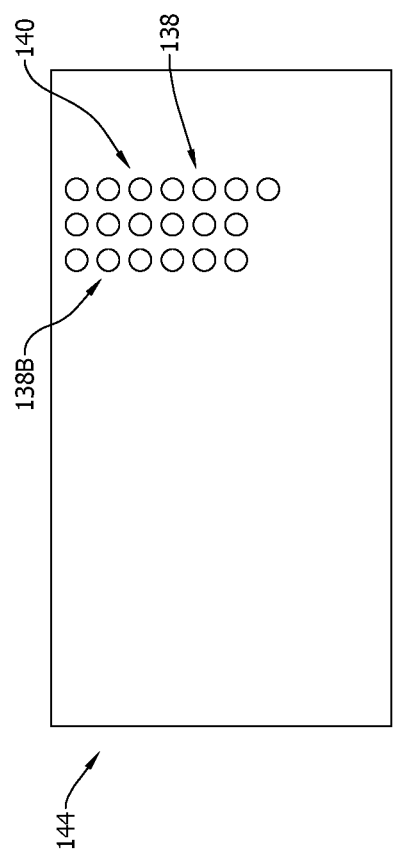
FIG. 3B is a front view of an example decompression panel having a second aperture array.

Referring to FIGS. 3A and 3B, each decompression panel assembly 120 includes a predetermined array 138 of apertures 140 that provide that decompression panel assembly 120 with a predetermined airflow restriction constant K that will combine with the suction force ΔP at the location of the decompression panel assembly 120 to result in a mass flow ṁ substantially similar to the mass flows ṁ of each other aisle 118. As described herein, when each aisle 118 has a substantially similar mass flow ṁ, cross-aisle airflow is reduced or prevented. FIG. 3A illustrates a decompression panel assembly 142 having a first array 138A. Similarly, FIG. 3B illustrates a decompression panel assembly 144 having a second array 138B. The number, location, and configuration of arrays 138A and 138B are based on the location of decompression panel assemblies 142 and 144 along aircraft 100. The location along aircraft 100 determines the proximity to one of components 122 of ECS 102 and the corresponding suction force associated therewith. As described herein, decompression panel assemblies 120 located closer to components 122 will generally have an array 138 with a lower number of apertures 140, and decompression panel assemblies 120 located farther from components 122 will generally have an array 138 with a higher number of apertures 140. Generally, decompression panel assemblies 120 may have an array 138 with any number of apertures 140 positioned anywhere on decompression panel assembly 120, and in any configuration to facilitate substantially similar mass flows and operation of ECS 102 as described herein.

Figure 4:
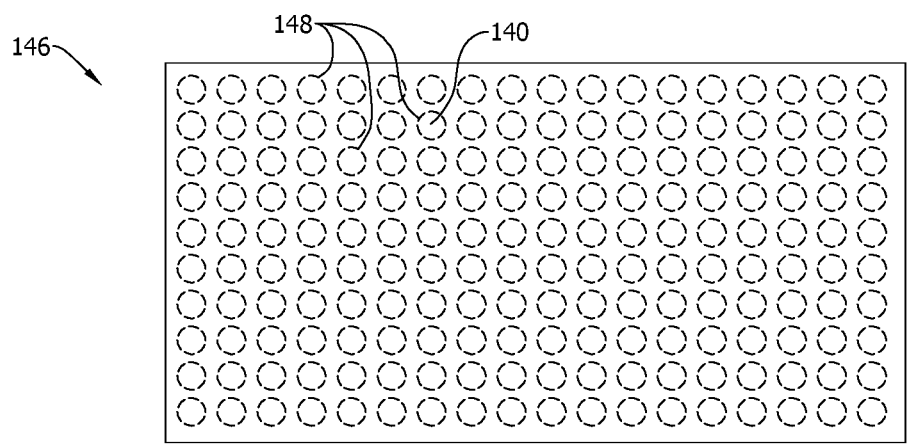
FIG. 4 is a front view of an alternate decompression panel for use in the environmental control system shown in FIG. 1.

In one embodiment, as shown in FIGS. 3A and 3B, decompression panel assemblies 142 and 144 are manufactured with corresponding arrays 138A and 138B, while the remainder of the panel is solid material. In another embodiment, shown in FIG. 4, a decompression panel assembly 146 is manufactured with a plurality of perforations 148 that define apertures 140 once they are removed. In such an embodiment, decompression panel assemblies 146 are manufactured identical to one another and then modified once its position in aircraft 100 is determined. Specifically, once the location is determined, a technician can remove the tabs defined by perforations 148 to provide the decompression panel assembly 1146 with a predetermined array 138 of apertures 140 that correspond to the determined location.

Figure 5:
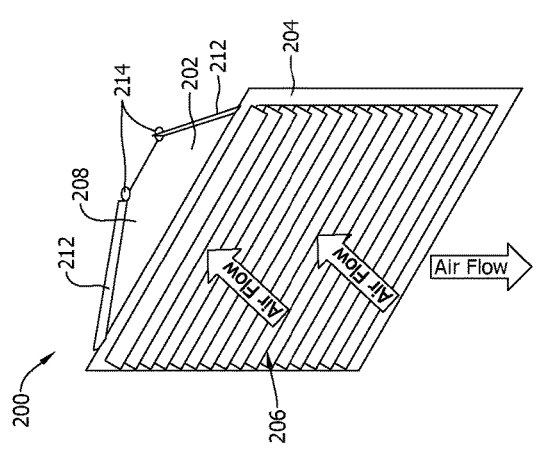
FIG. 5 is a front perspective view of an alternative decompression panel assembly that may be used in the environmental control system shown in FIG. 1.
Figure 6:
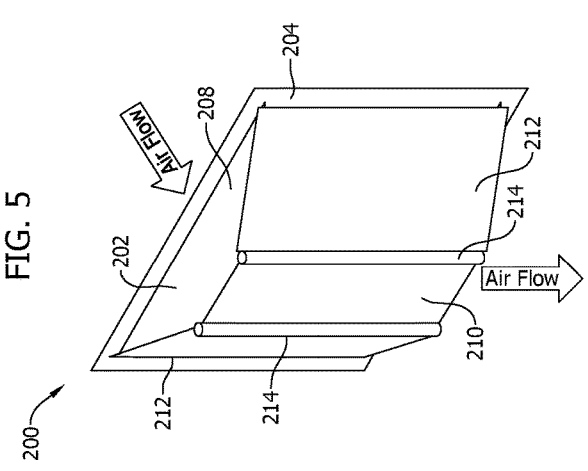
FIG. 6 is a rear perspective view of the decompression panel assembly shown in FIG. 5.

FIG. 5 is a front perspective view of an alternative decompression panel assembly 200 that may be used in ECS 102 (shown in FIG. 1). FIG. 6 is a rear perspective view of decompression panel assembly 200. In the embodiment, decompression panel assembly 200 includes a housing 202, a frame 204 coupled to housing 202, and an inlet grill 206 coupled to frame 204. In another embodiment, inlet grill 206 is coupled to housing 202. Housing 202 includes at least a top wall 208 and a rear wall 210. Decompression panel assembly 200 also includes a pair of decompression flaps 212 pivotably coupled to rear wall 210 via a hinge 214. In the embodiment, each decompression flap 212 extends between rear wall 210 and one of inlet grill 206 or frame 204 at an oblique angle such that decompression panel assembly 200 is substantially trapezoidal.

Figure 7:
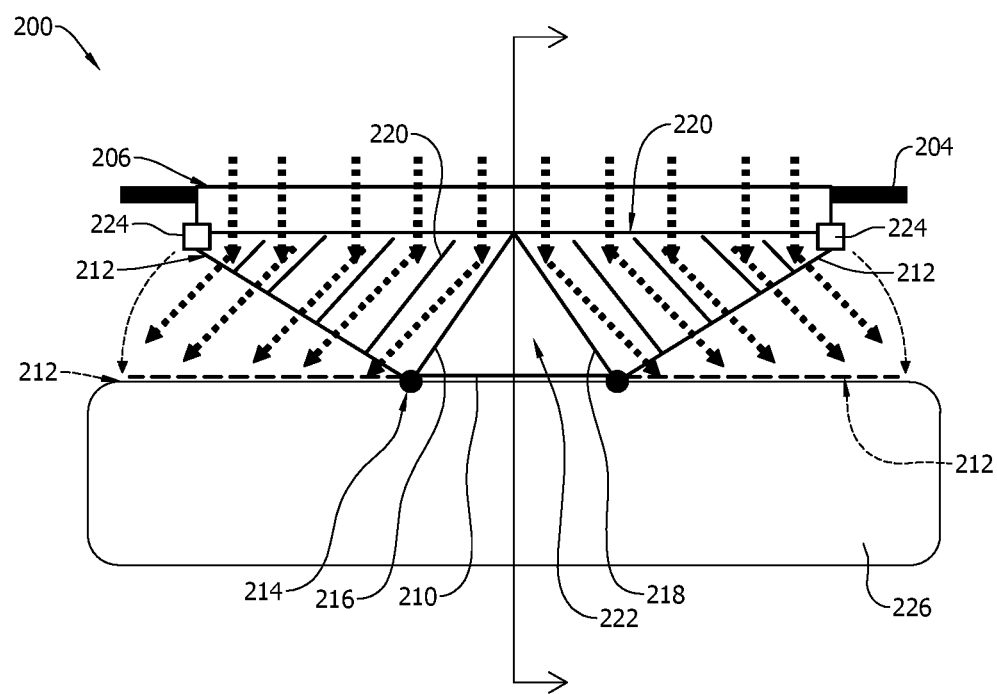
FIG. 7 is a top cross-sectional view of the decompression panel assembly shown in FIG. 5.

FIG. 7 is a top cross-sectional view of decompression panel assembly 200. In the embodiment, housing 202 includes a first inner wall 216, a second inner wall 218, and a plurality of guide vanes 220. Inner walls 216 and 218 combine with rear wall 210 to form a chamber 222 that receives airflow through inlet grill 206. More specifically, in normal operation (that is, not during decompression) a return airflow flows through a portion (shown in FIG. 8) of inlet grill 206, into chamber 222, and is pulled down through chamber 222 by components 122 of ECS 102. During normal operation, decompression flaps 212 are in a closed position, as illustrated by solid lines in FIG. 7, and block airflow through decompression panel assembly 200 except through chamber 222. During a decompression event, a latch 224 that attaches the distal end of each decompression flap 212 to the inlet grill 206 or frame 204 is released, and decompression flaps 212 pivot via hinge 214 to their decompression position, shown in broken lines in FIG. 7. In the decompression position, decompression flaps 212 open to abut against a sidewall interior 226 and to allow airflow through decompression panel assembly 200. During a decompression event, guide vanes 220 direct or channel the incoming airflow at an oblique angle with respect to the angle of the airflow through inlet grill 206. Changing the direction of the airflow prevents recirculation back through inlet grill 206 and into cabin 108.

Figure 8:
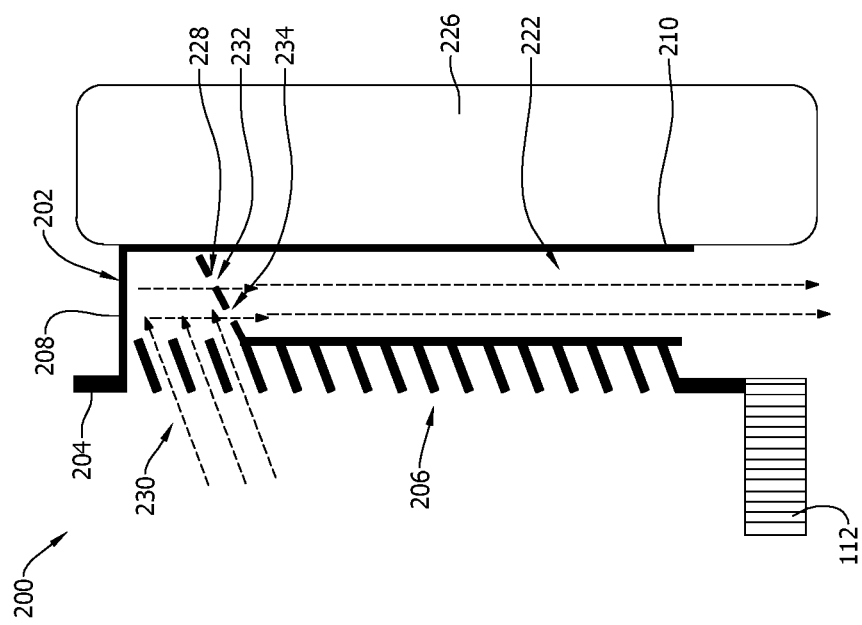
FIG. 8 is a side cross-sectional view of the decompression panel shown in FIG. 5.
Figure 9:
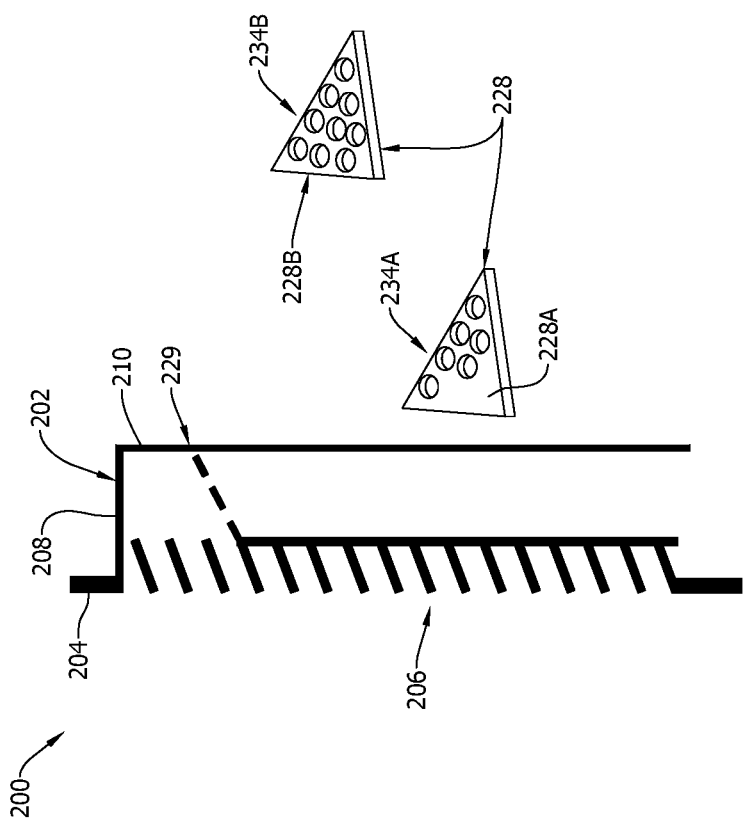
FIG. 9 is another side cross-sectional view of the decompression panel shown in FIG. 5 illustrating a pair of example inserts.

FIG. 8 is a side cross-sectional view of decompression panel assembly 200, and FIG. 9 is another side cross-sectional view of decompression panel assembly 200 illustrating a pair of example inserts 228. During normal operation, when decompression panels 212 are closed, an airflow enters chamber 222 through a portion 230 of inlet grill 206 and is channeled or drawn in a downward direction by the suction forces of components 122. In the embodiment, decompression panel assembly 200 includes an insert 228 positioned within chamber 222 and configured to provide a predetermined flow restriction to the airflow flowing therethrough based on the location of the insert 228 along the length of aircraft 100 and the proximity of insert 228 to various components 122 of ECS 102.

Insert 228 is removably coupled to housing 202 and/or inlet grill 206. More specifically, insert 228 is mechanically coupled to at least one wall 210, 216, and 218 of housing 202 with a fastening mechanism 229. For example, insert 228 may be friction fit, attach with fastening mechanism 229, such as a latch, or slide into a slot defined in chamber 222. Generally, insert 228 is coupling within chamber 222 by any means that facilitates operation of decompression panel assembly 200 as described herein.

As described above, decompression panel assemblies 200 closest to each component 122 of ECS 102 will have a higher suction or draw force, also known as a differential pressure, because of the close proximity. In order to prevent or reduce cross-aisle airflow and expose passengers of each aisle 118 only to air from their own aisle 118, the mass flow through each decompression panel 200, and each insert 228, specifically, should be the same. Because of the difference in suction forces, each decompression panel assembly 200 may have a different airflow restriction based on its location along the length of the aircraft. More specifically, decompression panel assemblies 200 positioned closer to components 122 of ECS 102 include an airflow restriction that is higher than decompression panel assemblies 200 spaced from components 122.

As shown in FIG. 9, each decompression panel assembly 200 includes an insert 228 having a predetermined array 234 of apertures 232 that provide that particular decompression panel assembly 200 with a predetermined airflow restriction that will combine with the suction force at the location of the decompression panel assembly 200 to result in a mass flow substantially similar to the mass flows of each other aisle 118. As described herein, when each aisle 118 has a substantially similar mass flow, cross-aisle airflow is reduced or prevented.

FIG. 9 illustrates a decompression panel assembly 200 and a pair of interchangeable inserts 228A and 229B that each include a predetermined aperture array 234A and 234B, respectively, formed therein. More specifically, aperture array 234A is different from aperture array 234B. The number, location, and configuration of arrays 234A and 234B are based on the location of decompression panel assembly 200 along aircraft 100. The location along aircraft 100 determines the proximity to one of components 122 of ECS 102 and the corresponding suction force associated therewith. As described herein, decompression panel assemblies 200 located closer to components 122 will generally have an array 234 with a lower number of apertures 232, and decompression panel assemblies 200 located farther from components 122 will generally have an array 234 with a higher number of apertures 232. Generally, decompression panel assemblies 200 may have an array 234 with any number of apertures 232 positioned anywhere on decompression panel assembly 200, and in any configuration to facilitate substantially similar mass flows and operation of ECS 102 as described herein.

The interchangeability of inserts 238 allows for all decompression panel assemblies 200 to be manufactured independent of the final location of the decompression panel assembly 200 on the aircraft 100. Once the location of a particular decompression panel assembly 200 is determined, a corresponding insert 228 can be positioned within chamber 222 that provides the decompression panel assembly 200 with the predetermined airflow restriction that combines with the suction force of components 122 to result in a mass flow substantially similar to mass flows of decompression panel assemblies 200 of surrounding aisles 118.

In one implementation, a decompression panel assembly for use in an aircraft is provided. The decompression panel assembly includes a frame, a housing including a rear wall that is spaced from the frame, and a pair of decompression panels coupled to the rear wall and extending toward the frame.

In another implementation, the pair of decompression panels are pivotably coupled to the rear wall via a hinge.

In another implementation, the pair of decompression panels extend obliquely toward the frame with respect to the rear wall.

In another implementation, the pair of decompression panels are configured to pivot with respect to the rear wall during a decompression event.

In another implementation, the decompression panel assembly further includes an inlet grill and a plurality of guide vanes configured to channel an airflow channeled through the inlet grill.

In another implementation, the plurality of guide vanes are obliquely oriented with respect to the inlet grill and the rear wall.

In another implementation, the rear wall at least partially defines a chamber within the housing.

In another implementation, the decompression panel assembly includes an insert configured to be positioned within the chamber to provide a predetermined airflow restriction through the decompression panel assembly.

In another implementation, the airflow restriction comprises an array of apertures formed in the insert, wherein the array of apertures is based on a location of the decompression panel assembly along a length of the aircraft.

In another aspect, a decompression panel assembly for use in an aircraft having an environmental control system is provided. The decompression panel assembly includes a frame and a housing comprising a rear wall that is spaced from the frame, wherein the rear wall at least partially defines a chamber. The decompression panel assembly also includes an insert configured to be positioned within the chamber and comprising an array of apertures configured to provide a predetermined airflow restriction through the decompression panel assembly. The array of apertures is based on a location of the decompression panel assembly along a length of the aircraft.

In another implementation, the insert is interchangeable with a second insert having a different array of apertures that provide a different airflow restriction.

In another implementation, the environmental control system comprises at least one component positioned along a length of the aircraft, and wherein the array of apertures comprises a higher number of apertures the farther the insert is located from the component along the length of the aircraft.

In another implementation, the array of apertures comprises a lower number of apertures the closer the insert is located to the component along the length of the aircraft.

In another implementation, the array of apertures are based on a proximity to the component along a length of the aircraft.

In another implementation, the housing further comprises a first inner wall and a second inner wall that both extend from the rear wall toward the frame and that further define the chamber.

In another implementation, the first inner wall and the second inner wall are obliquely oriented with respect to each other.

In another implementation, the decompression panel assembly further includes a pair of decompression panels pivotally coupled to the rear wall and extending toward the frame such that the pair of decompression panels extend obliquely toward the frame with respect to the rear wall.

In another implementation, the pair of decompression panels are configured to pivot with respect to the rear wall during a decompression event.

In another implementation, the decompression panel assembly further includes an inlet grill and a plurality of guide vanes configured to channel an airflow channeled through the inlet grill.

Examples described below include an environmental control system that facilitates minimizing airflow between passengers within confined spaces, such as aircraft passenger cabins. Example systems described provide decompression panel assemblies that include different flow restrictions based on their location along the length of the aircraft and proximity to other components of the environmental control system. In one example, the aircraft includes a first aisle having a first decompression panel assembly with a first array of apertures that define a first airflow restriction. Similarly, a second aisle includes a second decompression panel assembly having a second array of apertures that define a second airflow restriction different than the first airflow restriction. The different air flow restrictions are configured to provide a substantially similar mass flow through both the decompression panel assemblies. Having a similar mass flow through the decompression assemblies in each aisle facilitates limiting cross-circulation between passengers seated in adjacent aisles. Example systems facilitate reducing the spread of airborne contaminants between nearby occupants, reducing noise and undesirable drafts, and limiting the formation of stagnant zones of circulation within the confined space.

The systems and methods described are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present invention or the "example embodiment" are not intended to be interpreted as excluding the existence of additional embodiments that also incorporate the recited features.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art after reading this specification. Such other examples are intended to be within the scope of the claims if they have structural elements that do not differ from the literal language of the claims, or if they include equivalent structural elements with insubstantial differences from the literal language of the claims.

What is claimed is:

1. An environmental control system for use in an aircraft, the environmental control system comprising:
   at least one component positioned along a length of the aircraft; and
   a decompression panel assembly comprising a plurality of tabs and a plurality of perforations, wherein the plurality of tabs are removable such that the plurality of perforations define an array of apertures, wherein the array of apertures is based on a location of the decompression panel assembly along the length of the aircraft relative to the at least one component.

2. The environmental control system in accordance with claim 1, wherein the array of apertures is formed on an interchangeable insert.

3. The environmental control system in accordance with claim 2, wherein the interchangeable insert is configured to be positioned within a chamber defined by the decompression panel assembly.

4. The environmental control system in accordance with claim 1, wherein the array of apertures corresponds to a predetermined location along the aircraft.

5. The environmental control system in accordance with claim 1, wherein the at least one component includes at least one of a cooling filter, a recirculation filter, a mixing manifold, and an air conditioning pack.

6. An aircraft comprising:
   a first aisle comprising a first decompression panel assembly having a first array of apertures that define a first airflow restriction; and
   a second aisle comprising a second decompression panel assembly having a second array of apertures that define a second airflow restriction different than the first airflow restriction.

7. The aircraft in accordance with claim 6 further comprising an environmental control system comprising a component configured to provide a first suction force through the first decompression panel assembly and a second suction force through the second decompression panel assembly.

8. The aircraft in accordance with claim 7, wherein the first decompression panel assembly is positioned a first distance from the component and the second decompression panel assembly is positioned a second, longer distance from the component.

9. The aircraft in accordance with claim 8, wherein the first and the second airflow restrictions are based on a proximity to the component along a length of the aircraft.

10. The aircraft in accordance with claim 8, wherein the first suction force is larger than the second suction force.

11. The aircraft in accordance with claim 6, wherein the first airflow restriction is configured to provide a first mass flow of air through the first decompression panel assembly, wherein the second airflow restriction is configured to provide a second mass flow of air through the second decompression panel assembly, wherein the first mass flow and the second mass flow are substantially similar.

12. The aircraft in accordance with claim 6 wherein the first airflow restriction is greater than the second airflow restriction.

13. The aircraft in accordance with claim 6, wherein the first and the second airflow restrictions are based on a location of the first aisle and the second aisle along a length of the aircraft.

14. The aircraft in accordance with claim 13, wherein the first airflow restriction comprises a first array having a first number of apertures, and wherein the second airflow restriction comprises a second array having a second number of apertures greater than the first number of apertures.

15. The aircraft in accordance with claim 6, wherein the first and second airflow restrictions comprise an array of a plurality of apertures.

16. The aircraft in accordance with claim 6, wherein the first and second airflow restrictions comprise an array of a plurality of apertures formed on interchangeable inserts.

17. The aircraft in accordance with claim 16, wherein the interchangeable inserts are configured to be positioned within a chamber defined at least one of the first decompression panel assembly and the second decompression panel assembly.

18. The aircraft in accordance with claim 6 further comprising at least one component positioned along a length of the aircraft, the at least one component including at least one of a cooling filter, a recirculation filter, a mixing manifold, and an air conditioning pack.

19. An environmental control system for use in an aircraft, the environmental control system comprising:
   at least one component positioned along a length of the aircraft; and
   a decompression panel assembly comprising an array of apertures, wherein the array of apertures is based on a location of the decompression panel assembly along the length of the aircraft relative to the at least one component, and wherein the array of apertures comprises a higher number of apertures the farther the decompression panel assembly is located from the component along the length of the aircraft.

20. An environmental control system for use in an aircraft, the environmental control system comprising:
   at least one component positioned along a length of the aircraft; and
   a decompression panel assembly comprising an array of apertures, wherein the array of apertures is based on a location of the decompression panel assembly along the length of the aircraft relative to the at least one component, and wherein the array of apertures comprises a lower number of apertures the closer the decompression panel assembly is located to the component along the length of the aircraft.

* * * * *